March 4, 1930.  H. J. GRAHAM  1,749,247
LUBRICATING SYSTEM
Filed June 14, 1922  2 Sheets-Sheet 1
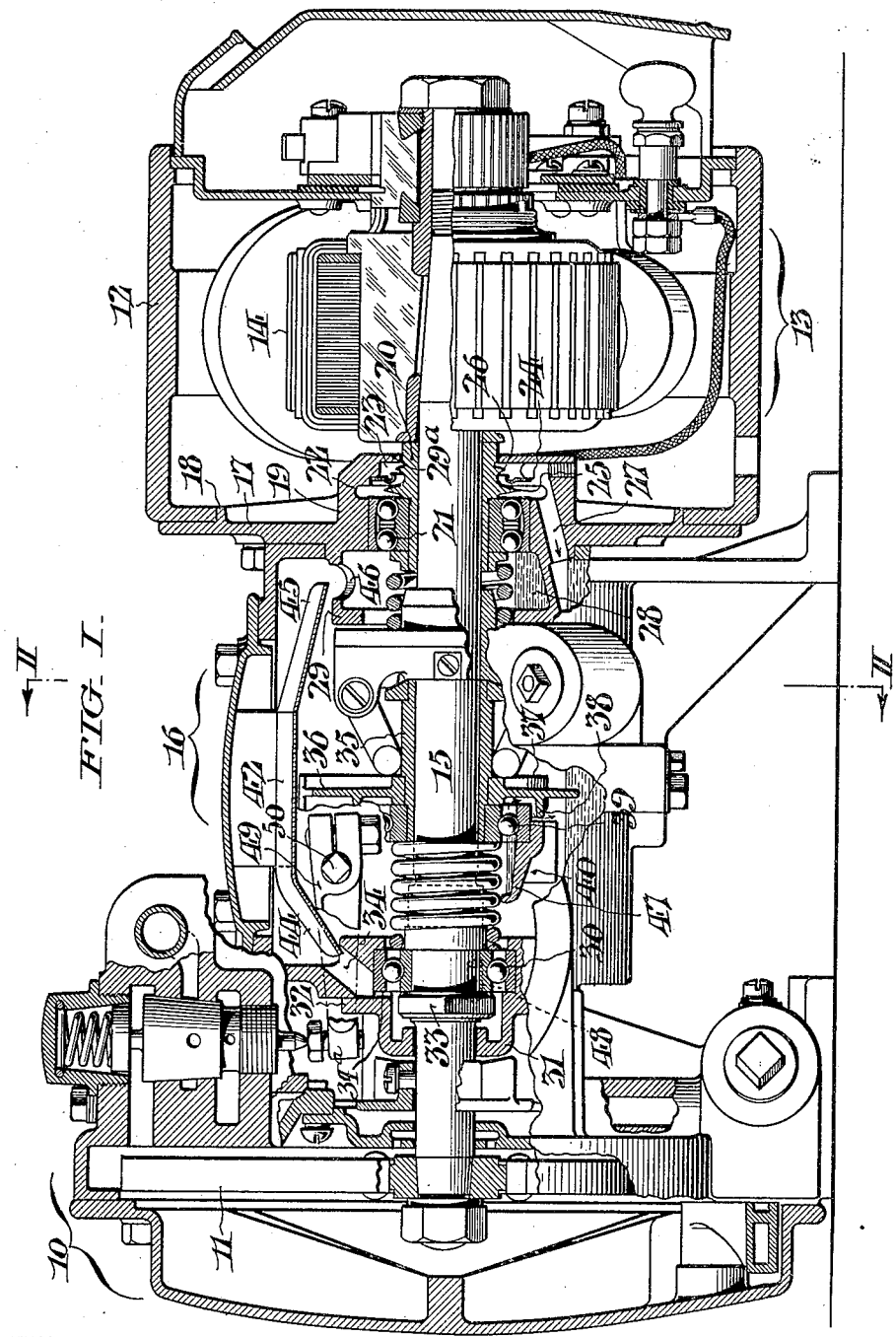
WITNESSES:  INVENTOR:
  Herbert J. Graham,
BY
  ATTORNEYS.

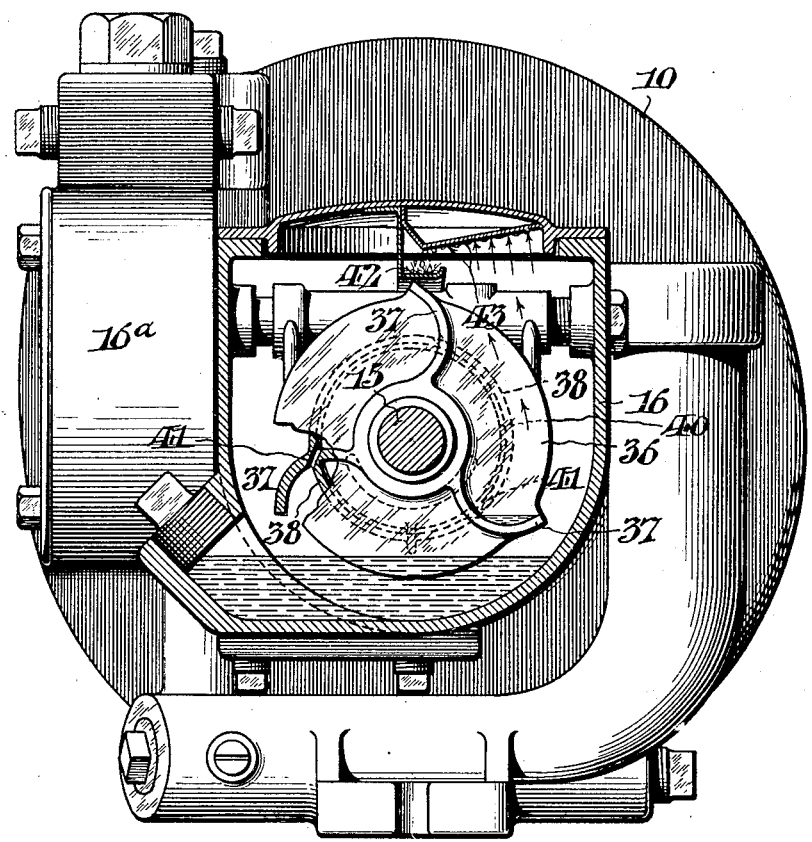
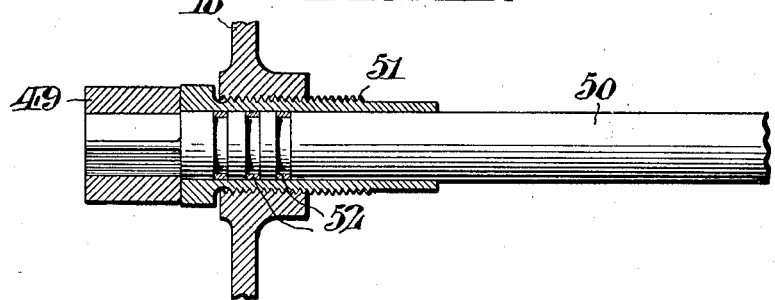

Patented Mar. 4, 1930

1,749,247

UNITED STATES PATENT OFFICE

HERBERT J. GRAHAM, OF PHILADELPHIA, PENNSYLVANIA, ASSIGNOR TO ELECTRIC SERVICE SUPPLIES COMPANY, OF PHILADELPHIA, PENNSYLVANIA, A CORPORATION OF PENNSYLVANIA

LUBRICATING SYSTEM

Application filed June 14, 1922. Serial No. 568,154.

This invention relates to turbo-generators for locomotive headlights, of the type characterized by the provision of a steam turbine and a generator, directly coupled by means of a shaft, which latter extends through an intermediate casing designed to house the governor mechanism and other elements usually associated with such generating units.

An object of this invention is to provide an improved system and means for distributing the lubricating oil throughout the entire working parts of the unit, so as to lubricate all surfaces requiring same, and incidentally to prevent the entrance of oil into the generator where its presence would be injurious to the efficient operation of the same, as well as to preclude the needless loss of oil at the turbine end.

Another object of the invention is to provide a novel means consisting of an assembly of coordinated elements designed particularly for use in a generating unit of the character typified, whereby the oil is distributed primarily to the bearings requiring constant lubrication, and secondarily by splashing to other working parts located in close relation to the splashing means.

In addition to the foregoing, this invention comprehends improvements in the details of construction and the arrangement of the correlated parts to be hereinafter set forth and particularly pointed out in the appended claims.

In the accompanying drawings, Fig. I is a view in longitudinal section of a turbine generator unit, embodying my improved system of oil distribution.

Fig. II is a view in transverse section taken on the line II—II of the preceding figure; and, Fig. III is a detail view in section of the governor shaft bushing.

The illustrated form of direct coupled turbine generator consists in its essentials of a turbine casing enclosing a rotor, a generator casing enclosing the electrical energizing element and an intermediate casing forming a connection therebetween and designed to enclose a shaft which forms a rotative connection for the transmission of power from the rotor to the generator, and incidentally to enclose controlling elements for coordinating the driving and driven units. The present invention contemplates the provision of an oil distributing means in a generator unit of this construction, but for the sake of convenience, the improvements are illustrated in the accompanying drawings as embodied in a unit of the construction shown in Patent No. 1,311,878, disclosing a turbo-generator unit and the rudiments of an oil distribution arrangement upon which the present invention is an amplification and improvement. With reference to the drawings, 10 indicates generally a casing designed to enclose the rotor 11 of the turbine, and 12 indicates a casing for containing the electrical generator designated comprehensively by the numeral 13, including an armature 14, which is mounted upon one end of a shaft 15, to the other end of which the rotor 11 is rigidly secured. The shaft 15 extends through an intermediate casing 16, which contains a governor mechanism and other elements necessary for the efficient operation of the unit. The casings 12 and 16 are preferably secured together through the medium of a diaphragm, plate or septum 17, having at one side an annular flange 18 which enters a relatively large opening in the adjacent end wall of the casing 12, and is provided centrally with a cylindrical enlargement 19, constituting a journal box, the ends of which extend beyond the sides of the plate 17, one portion of said enlargement extending into an opening formed in the adjacent end wall of the casing 16. The opposite, or right hand end of the journal box 19, with respect to Fig. I of the drawings, extends into the generator casing 12, and is bored longitudinally to permit the passage therethrough of the shaft 15, which carries at this point a sleeve 20. An anti-friction bearing 21 preferably of the ball bearing type including concentric race members surrounds the sleeve 20, the outer race member of which is supported within the journal 19. If desired, an ordinary bearing may be used directly on the shaft 15. The right hand end of the journal box 19 is enlarged internally to form an annular cavity 22 and a second annular cavity 23, smaller in diameter, said cavities being separated by means of a disk 24, having a central opening through which the sleeve 20 extends, and having the material at the periphery of said opening curved in two directions to provide a ridge at each side for a purpose to be presently noted. The sleeve 20 is formed with an annular fin 25, which operates within the channel 22, and a smaller annular fin 26, which operates within the channel 23. A passage 27 is formed in the lower wall of the journal box 19, communicating with the cavities 22 and 23, which is designed to conduct oil therefrom and to discharge the same into the intermediate casing 16. The left hand end of the journal box 19 is enlarged to form an annular internal cavity 28, having an end wall 29, bored centrally to permit the passage therethrough of the shaft 15 with certain elements carried by said shaft, and, the right hand end of the journal box is formed with an inturned flange 29a, ensuring a minimum amount of clearance with respect to the protruding end of the sleeve 20, to further prevent the creeping of oil beyond said flange into the generator casing 12. The left hand end wall of the casing 16 constitutes a journal member enclosing an anti-friction bearing 30 preferably of the ball bearing type, although any other type of bearing may be used, for the support of the turbine end of the shaft 15, and applied to the outer surface of said end wall is a cup member 31, enclosing the shaft 15 with a minimum amount of clearance, and having an annular flange 32 for attachment to the end wall of the governor casing 16. A nut 33, provided primarily as a securing element engaging one side of the ball bearing 30 and cooperating with a collar or shoulder formed on the shaft 15 to guide rotation of the latter against axial shifting movement, also functions as a centrifugal impeller to discharge oil radially against the inner walls of the cup member 31, which is supplied with lubricant by means of a passage or pocket 34 formed in the upper portion of the journal box, carried by the end wall of the governor casing. This passage or pocket 34 is restricted in capacity and is provided with a relatively small outlet 34a of an area to regulate the rate of flow of lubricant to the bearing 30. This feature is important because the quantity of lubricant and the rate at which it is fed to the passage or pocket 34 is variable under different speeds of the generator unit and for different heights of lubricant in the main oil reservoir, while control of the rate of flow of lubricant prevents—under any condition of operation—too much lubricant entering the cup member 31. Also, there is avoided the chance of loss of lubricant by way of the shaft clearance in the cup member 31. This combination of passage or pocket 34 into which lubricant can be fed at any rate, and from which the lubricant flow to the bearing is automatically controlled to a proper quantity and rate, is very important. Such quantity of lubricant in excess of the capacity, of the passage or pocket 34, that is fed into the same overflows back into the main reservoir. By this combination of passage or pocket 34 and relatively small outlet 34a there is secured the additional advantage that, as the generator unit slows down and finally stops, the supply of lubricant that has been stored in the passage or pocket 34 is fed by gravity through the small outlet 34a and thus insures that the bearing surfaces are covered with ample lubricant which prevents rust and deterioration when the generator unit is idle. This final automatic lubrication of the bearing being accomplished when the speed of the bearing is decreasing to zero means that a better coating of lubricant is deposited for protection of the bearing parts when idle than would be the case if such protective lubricant were fed into the bearing when running at high speed inasmuch as centrifugal force would throw the lubricant off the bearing surfaces, and no protective coating would be present to prevent rust. Located within the governor and oil reservoir casing 16 at approximately a central point, and for convenience affixed to a sleeve 35 surrounding the shaft 15 is an oil impeller consisting of a disk 36 having a plurality of radial vanes 37 at each side thereof, which vanes extend more or less radially and are curved with their ends extending preferably beyond the periphery of said disk. The impeller disk 36, if desired, may be mounted on the governor directly on the shaft 15; or, for that matter, upon any rotating part found convenient. An annular flange 38 is formed upon one side of the disk 36 to partially enclose a ball bearing 39, constituting the governor thrust bearing, which is held within the governor bearing ring 40, the latter being provided with an oil cavity open at the top. Each of the vanes 37 at the side of the disk 36, upon which the flange 38 is formed, is provided with a restricted aperture 41, through which a portion of the lubricant may be directed and supplied to the bearing 39 during rotation of the impeller disk 36. Located above the impeller 36 is an oil collecting and distributing device comprising a trough member 42, suspended from the top wall of the intermediate casing 16 and having an open portion which is opposed to the direction of curvature of the vanes 37 of the impeller 36 and to the direction of rotation thereof, so that lubricant may be gathered up by said impeller and thrown by centrifugal force into the trough 42. This action is facilitated by the provision of a deflector plate 43, having an inclined portion against which the oil is thrown by the impeller 36 which is directed downwardly into the trough 42. One end of the trough 42, indicated at 44, is inclined downwardly and adapted to discharge into the aforesaid reservoir 34 of the rotor bearing, while the opposite end of said trough, indicated at 45, is inclined downwardly to discharge into an opening 46, formed in the top wall of the journal box 19, and communicating with the enlarged cavity 28 thereof. This opening 46 is restricted in capacity so as to prevent, under any condition of operation, too much lubricant entering the enlarged cavity 28 whereby there is avoided any excess flooding of the bearing 21 with lubricant. It will be obvious that the trough 42 may be suspended from any other portion of the casing 16, or instead of a separate trough may be in the form of a runway cast with the wall, or in fact any structure may be used that will act as a feeding pocket to carry the oil to the parts to be lubricated.

The intermediate casing 16 is initially filled with lubricant to a level which is determined by the height of a filling or overflow opening with which said casing is provided. During rapid rotation of the shaft 15 and under normal operation of the generator unit, the impeller 36 functions to scoop oil from the source of supply in the lower portion of the intermediate casing 16 and to discharge it against the deflector surface 43, by which the lubricant is directed into the trough 42. Also some oil splashes into the trough 42. The oil is initially held within the curved sides of the vanes 37 by its own inertia which is subsequently overcome by centrifugal force and said oil directed against the deflector plate 43, in the manner stated. A good portion of the oil thus thrown outwardly from the impeller 36 is directed in the form of a spray against the deflector plate 43 and flows in globules along said plate until it is collected and coalesced within the trough 42. The central portion of the trough 42, it will be noted, is in part horizontal with slopes toward either end, so that the oil is divided substantially equally, and is conveyed and discharged into the passage or pocket 34, from which it flows by way of the outlet 34ᵃ and collects within the cup member 31, and also through the opening 46 for collection within the cavity 28. The quantity of lubricant reaching the bearings 30 and 31 is controlled by the area of the passageway 34ᵃ and the hole 46, respectively. The continuous flow of oil to the cup member 31 maintains a level therein high enough to permit revolving parts of the bearing 30 to travel through a puddle of oil, which oil flows through the bearing between the anti-friction members thereof, lubricates, absorbs heat during its passage, washes out abraded material, and finally gravitates back into the lower part of the intermediate casing 16. With respect to the opposite end of the path of distribution, the oil flows into the cavity 28 and collects therein, maintaining a level which, as shown in the drawings, is high enough to permit revolving parts of the bearing 21 to travel therein, thence flowing between the anti-friction members of the bearing to the right, with respect to Fig. I of the drawings, lubricating, absorbing heat in transit, carrying away abraded material, finally entering the passage 27, and returning to the lower part of the intermediate casing 16. At this point particular attention is directed to the fact that any excess lubricant that may creep along the sleeve 20 or be discharged from between the moving parts of the bearing 21, will be thrown radially from the larger or first fin 25—to be encountered—by centrifugal force and directed against the walls of the cavity 22, draining to the bottom of said cavity and into the passage 27, and thence returning to the oil reservoir. An additional precaution to prevent entrance of oil into the generator 13 is provided by virtue of the smaller fin 26 which functions to direct—in a similar manner—any remaining lubricant that may escape the action of the fin 25 and throw it against the walls of the cavity 23 by centrifugal force, from whence it is returned through the passage 27 to the reservoir. The disk 24 by reason of its redirected periphery functions at opposite sides to direct any lubricant collected thereby in a downward direction, following the curved ridges at either side, so that the lubricant thrown or gathering at this point is eventually drained back into the reservoir. Thus, through the provision of this combination of fins 25, 26 and disk 24, as well as the overhanging flange 29ᵃ, any possibility of oil entering the generator casing 12 is almost entirely precluded or to an extent where the quantity of oil passing is negligible. Under the rotating influence of the impeller 36, the lubricant is splashed over the entire interior of the central chamber 16, thoroughly lubricating all of the governor and other parts housed therewithin, and in addition a sufficient quantity of the splashed oil is directed into and collected in the pocket 47 of the governor bearing ring 40 by splashing downward into the open top of the cavity 47 and by dripping from stationary parts of the mechanism directly above—and on which lubricant collects—and flows by gavity to maintain a definite level therein so that the excess may flow through the governor thrust bearing 39, and thoroughly lubricate and wash the same, flowing from its other side and returning to the main reservoir. The annular flange 38 mentioned above as forming part of the impeller 36, constitutes a partially enveloping housing for the governor thrust bearing 39, and also functions to preclude the excessive withdrawal of oil from the pocket 47 under the rotative influence of the impeller 36. The closely spaced relation of the web of the impeller 36 and the flange 38, with respect to the thrust bearing 39, creates a narorw passage which deters, to some extent, too rapid draining of oil from the pocket 47. As a further precaution to prevent the excessive accumulation of oil within the cup member 31, so as to avoid the possibility of oil passing between the edge of said cup member and the shaft 15, a passage 48 may be drilled in the end wall of the intermediate casing 16, thereby establishing communication between the interior of the cup 31 and the reservoir at a point adjacent the intended normal level of the oil, so that any excess lubricant may drain from the cup member 31 back into said reservoir. As a further precaution to prevent flooding of the bearing 21, the enlarged cavity 28 is arranged with a proper overflow level so that flooding of the bearing with lubricant is further avoided.

To avoid the entrance of water into the intermediate casing 16 from the turbine 10 through the lateral casing 16ᵃ—Fig. II—containing the valve controlling arm 49, I may pack the governor shaft 50 in the manner shown in Fig. III. The shaft 50 is journalled in a bushing 51 threaded in an opening of the casing wall 16 and that portion of the shaft within said bushing is grooved circumferentially at several places to receive packing rings 52.

Thus, it will be seen that I have provided a novel system looking particularly toward the distribution of oil to, and circulation of oil through, the main bearings of the shaft in a generator unit, whereby the circulation of the lubricant is continuous, and hence I do not limit myself to the exact arrangement of distribution channels, pockets or correlated elements, as the specific arrangement set forth above may be varied to accomplish analogous results without departing from the general spirit of the invention. Other variations and arrangements of the parts described with a view to embodying the essential principle of the invention in generator units of other types or constructions may be readily resorted to by persons skilled in the art without departing from the spirit of the invention, or the scope of the appended claims.

The lubricating system herein described could be embodied in many forms of machines and the arrangement of the bearings and the governor means could be in many combinations without departing from the spirit of my invention. For instance, the bearings or the governor means could be located anywhere on the shaft and each could be separably housed or housed in any combination and this improved lubricating system could be applied to all of these combinations.

Having thus described my invention, I claim:

1. In a turbo-generator, the combination of a rotary shaft, a chamber through which said shaft extends affording an oil reservoir beneath the shaft and having a bearing seat in one of its walls, a bearing for the shaft in said seat, means on one side of the chamber wall affording a cavity for oil with discharge through the bearing, but permitting removal of the bearing from that side through the cavity, means for raising and delivering oil from the reservoir to said cavity, and means affording an oil receiving cavity at the other side of the bearing, with discharge back to the reservoir.

2. In a turbo-generator, the combination of a rotary shaft and a bearing therefor, means at one side of the bearing affording an annular oil-receiving cavity around the shaft with discharge through the bearing, means for raising and delivering oil from the reservoir to said cavity, and means affording an annular oil-receiving cavity at the other side of the bearing, with discharge back to the reservoir.

3. In a turbo-generator, the combination of a rotary shaft and a bearing therefor, means at one side of the bearing affording an annular oil-receiving cavity around the shaft with discharge through the bearing, means for raising and delivering oil from the reservoir to said cavity, and means affording multiple annular oil-receiving cavities at the other side of the bearing, with discharge back to the reservoir.

4. In a turbo-generator, the combination of a rotary shaft, a chamber through which said shaft extends affording an oil reservoir beneath the shaft, a bearing seat in one of its walls, a bearing for the shaft in said seat, a housing on the inside of the chamber wall affording an oil-receiving cavity with discharge through the bearing and having an opening around the shaft sufficient to pass the bearing, and a housing on the outside of the wall affording a cavity to receive oil from the bearing, with means for draining oil from said latter cavity through the wall back to the reservoir.

5. In a turbo-generator, the combination of a rotary shaft, a chamber through which said shaft extends affording an oil reservoir beneath the shaft, a bearing seat in one of its walls, a bearing for the shaft in said seat, a housing on the outside of the chamber wall detachable to permit removal of the bearing and affording an oil chamber with discharge through the bearing back to the reservoir, an oil receiving cavity in the wall open into the main chamber above the bearing, with an opening into said oil chamber, and means for raising and delivering oil from the reservoir to said latter cavity.

6. In a turbo-generator, the combination of a rotary shaft, a chamber through which said shaft extends affording an oil reservoir beneath the shaft, bearings for the shaft removably mounted on the chamber walls, a housing on the inside of one chamber wall affording an oil-receiving cavity with discharge through the bearing and having an opening around the shaft sufficient to pass the corresponding bearing, means for receiving the oil at the other side of the bearing and returning it to the reservoir, a housing on the outside of the other chamber wall detachable to permit removal of the bearing and affording an oil chamber with discharge through the bearing back to the reservoir, means affording an oil receiving cavity above the bearing with discharge into said oil chamber, and means for raising and delivering oil from the reservoir to both of the aforesaid oil-receiving cavities.

In testimony whereof, I have hereunto signed my name at Philadelphia, Pennsylvania, this 13th day of June, 1922.

HERBERT J. GRAHAM.